US008484630B2

United States Patent
Cui et al.

(10) Patent No.: US 8,484,630 B2
(45) Date of Patent: Jul. 9, 2013

(54) CODE MOTION BASED ON LIVE RANGES IN AN OPTIMIZING COMPILER

(75) Inventors: Shimin Cui, Toronto (CA); Raul Esteban Silvera, Woodbridge (CA)

(73) Assignee: International Business Machines Corporation, Armonk, NY (US)

( * ) Notice: Subject to any disclaimer, the term of this patent is extended or adjusted under 35 U.S.C. 154(b) by 1232 days.

(21) Appl. No.: 12/343,228

(22) Filed: Dec. 23, 2008

(65) Prior Publication Data

US 2010/0162220 A1 Jun. 24, 2010

(51) Int. Cl.
*G06F 9/45* (2006.01)

(52) U.S. Cl.
USPC .......................... 717/156; 717/151; 717/155

(58) Field of Classification Search
None
See application file for complete search history.

(56) References Cited

U.S. PATENT DOCUMENTS

| | | | | | |
|---|---|---|---|---|---|
| 4,961,141 | A | * | 10/1990 | Hopkins et al. | 717/151 |
| 5,175,856 | A | * | 12/1992 | Van Dyke et al. | 717/151 |
| 5,193,190 | A | * | 3/1993 | Janczyn et al. | 717/156 |
| 5,303,377 | A | * | 4/1994 | Gupta et al. | 717/155 |
| 5,450,588 | A | * | 9/1995 | Hoxey | 717/156 |
| 5,481,708 | A | * | 1/1996 | Kukol | 717/155 |
| 5,491,823 | A | * | 2/1996 | Ruttenberg | 717/161 |
| 5,557,761 | A | * | 9/1996 | Chan et al. | 717/156 |
| 5,577,253 | A | * | 11/1996 | Blickstein | 717/156 |
| 5,659,754 | A | * | 8/1997 | Grove et al. | 717/158 |
| 5,701,489 | A | * | 12/1997 | Bates et al. | 717/157 |
| 5,710,927 | A | * | 1/1998 | Robison | 717/155 |
| 5,978,588 | A | * | 11/1999 | Wallace | 717/159 |
| 6,014,510 | A | | 1/2000 | Burks et al. | |
| 6,014,519 | A | | 1/2000 | Egashira | |
| 6,026,241 | A | * | 2/2000 | Chow et al. | 717/152 |
| 6,072,952 | A | * | 6/2000 | Janakiraman | 717/155 |
| 6,151,706 | A | * | 11/2000 | Lo et al. | 717/155 |
| 6,260,190 | B1 | * | 7/2001 | Ju | 717/156 |
| 6,286,135 | B1 | * | 9/2001 | Santhanam | 717/146 |
| 6,430,741 | B1 | | 8/2002 | Mattson, Jr. et al. | |
| 6,643,630 | B1 | * | 11/2003 | Pegatoquet et al. | 706/45 |
| 7,185,330 | B1 | | 2/2007 | Khu | |
| 7,213,242 | B2 | * | 5/2007 | Robison | 717/151 |
| 2006/0101435 | A1 | | 5/2006 | Akilov et al. | |
| 2006/0158354 | A1 | * | 7/2006 | Aberg et al. | 341/50 |
| 2008/0208560 | A1 | * | 8/2008 | Johnson et al. | 703/22 |
| 2008/0216051 | A1 | * | 9/2008 | Johnson et al. | 717/110 |
| 2009/0106744 | A1 | * | 4/2009 | Li et al. | 717/151 |

OTHER PUBLICATIONS

Neil E. Johnson "Code size optimization for embedded processors" University of Cambridge , Nov. 2004 , <http://www.cl.cam.ac.uk/techreports/UCAM-CL-TR-607.pdf> pp. 1-159.*

(Continued)

*Primary Examiner* — Thuy Dao
*Assistant Examiner* — Samuel Hayim
(74) *Attorney, Agent, or Firm* — Yee & Associates, P.C.; David A. Mims, Jr.

(57) ABSTRACT

Optimizing program code in a static compiler by determining the live ranges of variables and determining which live ranges are candidates for moving code from the use site to the definition site of source code. Live ranges for variables in a flow graph are determined. Selected live ranges are determined as candidates in which code will be moved from a use site within the source code to a definition site within the source code. Optimization opportunities within the source code are identified based on the code motion.

20 Claims, 2 Drawing Sheets

OTHER PUBLICATIONS

Richard Gerber et al., "Compiling Real-Time Programs With Timing Constraint Refinement and Structural Code Motion", IEEE, 1995, <http://ieeexplore.ieee.org/stamp/stamp.jsp?tp=&arnumber=387469> pp. 1-16.*

Jens Knoop et al., "Optimal Code Motion: Theory and Practice", ACM, 1994, <http://delivery.acm.org/10.1145/190000/183443/p1117-knoop.pdf>, pp. 1-39.*

* cited by examiner

CODE MOTION BASED ON LIVE RANGES IN AN OPTIMIZING COMPILER

BACKGROUND

1. Field of the Invention

The present disclosure relates generally to static code analysis in compilers and more specifically to optimizing the performance of a compiler by transforming the position of program code in a compiler.

2. Description of the Related Art

There are many different techniques used to optimize code in a compiler. Code may be removed, added, deleted, folded or rearranged. In some systems, a compiler may detect that moving code from one location in a program to another may generate more effective machine code. However, the existing code motion techniques for optimizing code have some limitations. For example, the conventional method to move code from definition site to use site may not be performed safely due to aliasing or the limited alias knowledge of the variables involved. There is a need for new and better ways of compiling instructions to move code from the use site to the definition site to allow for efficient operation.

BRIEF SUMMARY

This disclosure describes a new approach to optimizing code in a compiler through code motion techniques based on live range analysis. Variables identified in a live range analysis are renamed base on the code patterns of the reached uses of the variables in the live range.

According to a disclosed class of innovative embodiments, there is disclosed a method of compiler optimization comprising determining whether the identified live range is a candidate for code motion in the source code; designating, based on a live range analysis, a variables in source code that are candidates for a renaming of the variables; determining, based on a criteria, whether the variables of a live range are candidates for code motion in the source code; responsive to a positive determination, modifying the code at the definition and the use sites; and optimizing the code in the compiler based on the modification.

According to a disclosed class of innovative embodiments, there is disclosed a computer program product comprising computer recordable media including instructions, which when executed by a processor, performs actions that optimizes source code in a compiler, the actions comprising: determining whether an identified live range is a candidate for code motion in the source code; designating, based on a live range analysis, a variables in source code that are candidates for a renaming of the variables; determining, based on a criteria, whether the variables of a live range are candidates for code motion in the source code; responsive to a positive determination, modifying the code at the definition and the use sites; and optimizing the code in the compiler based on the modification.

According to a disclosed class of innovative embodiments, there is disclosed a system that performs code optimization in a compiler, the system comprising a processor; a memory coupled to the processor, the memory storing computer executable instructions, the instructions comprising computer usable code that determines whether an identified live range is a candidate for code motion in the source code; computer usable code that designates, based on a live range analysis, variables in source code that are candidates for a renaming of the variables; computer usable code that determines, based on a criteria, whether the variables of a live range are candidates for code motion in the source code; computer usable code that, responsive to a positive determination, modifies the code at the definition and the use sites; and computer usable code that optimizes the code in the compiler based on the modification.

DETAILED DESCRIPTION

The present disclosure is described below with reference to flowchart illustrations and may include one or more block diagrams of methods, apparatuses, systems, and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

As will be appreciated by one skilled in the art, the present disclosure may be embodied as a system, method, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present disclosure may take the form of a computer program product embodied in any tangible medium of expression having computer usable program code embodied in the medium. The present disclosure should in no way be limited to the illustrative implementations, drawings and techniques described herein, but may be modified within the scope of the appended claims along with their full scope of equivalents.

In embodiments of this disclosure, source code is optimized based on identifying live ranges within a compiler and determining candidates for code motion.

Figure 1:
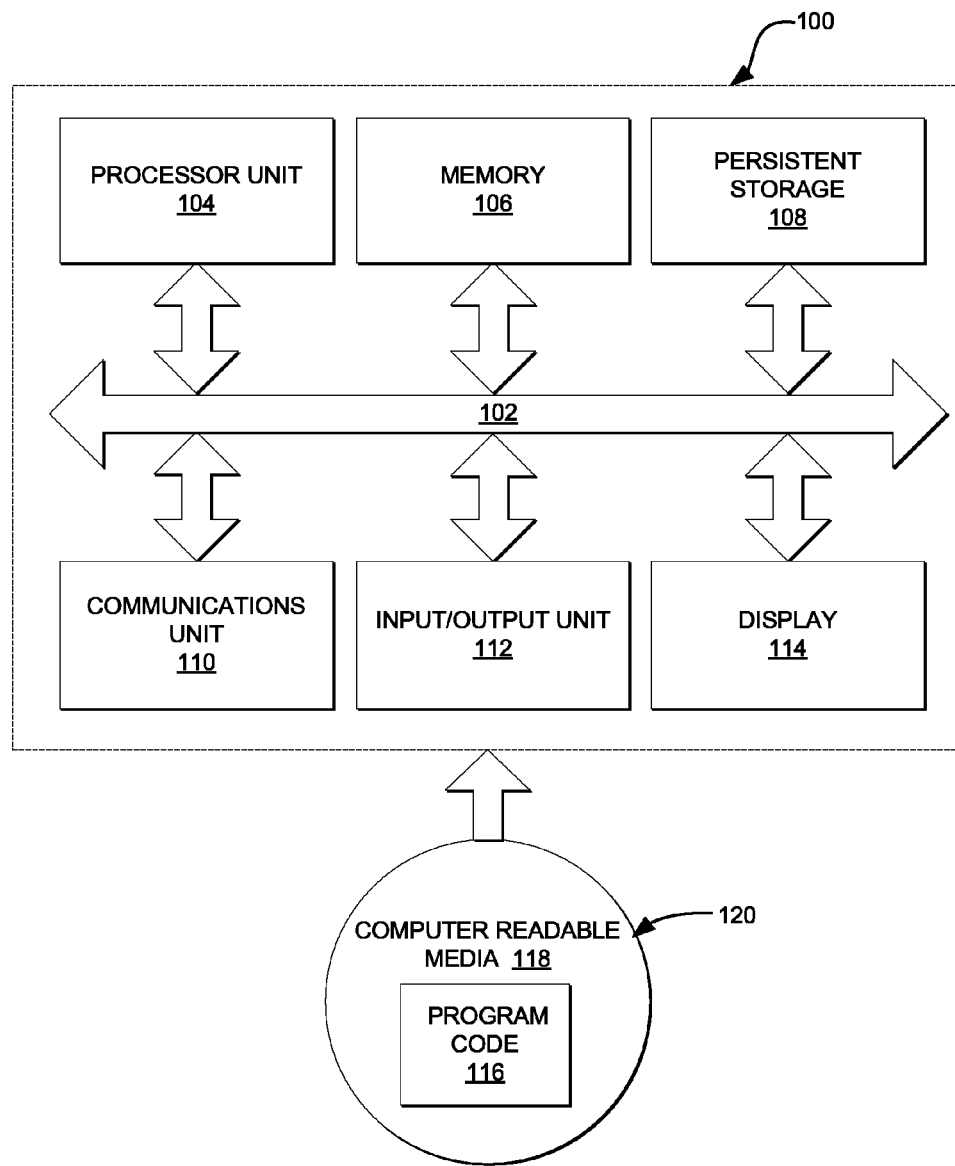
FIG. 1 is a block diagram of an exemplary software environment that may be operable for various embodiments of the disclosure.

Turning now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one embodiment, computer readable media 118 may exist in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, or transmission-type media, such as communications links or wireless transmissions containing the program code.

In some illustrative embodiments, program code 116 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 116 may be a server computer, a client computer, or some other device capable of storing and transmitting program code 116.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

The disclosure provides a method of compiler optimization through rearranging code as part of a live range analysis. Code is rearranged by moving the code from the Use site to the Definition site of the code. The rearrangement of code from the Use site to the Definition site of the code enables optimum code folding or simplification of expressions on the definition site.

The process analyzes the program code structure by building control flow graphs and data flow graphs. The control flow graph provides information about the structural connection between basic blocks of the code. The data flow graph discloses the relations between the variables defined in the code and the use of the variables. Live ranges are identified in the graphs.

In an embodiment, the program code may be converted to a static single assignment (SSA) representation to facilitate identifying live ranges in the program code. The system traverses a dominator tree in a top down manner and looks for a SSA definition node. The SSA def nodes are traversed and each live range of the variables definitions is computed recursively. Starting with the definition node, the system computes the live range of the variable defined recursively. The live ranges for all the referenced variables may be identified after the SSA definition nodes are traversed.

For each variable referenced in the program code, the live ranges that are candidates for variable renaming are identified. Some live ranges are not candidates for variable renaming. For example, live ranges in functions must be kept intact because they may be referenced later. Therefore, they are not candidates for renaming. Additionally, live ranges that are live on entry or exit of a program are also not candidates for renaming.

Figure 2:
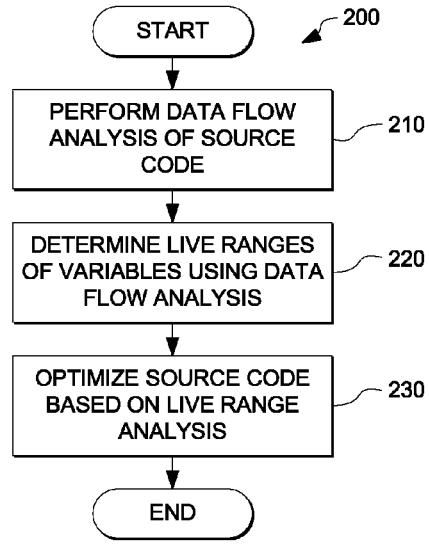
FIG. 2 is a top level flowchart of the method according to an embodiment of the present disclosure.

FIG. 2, flowchart 200, provides a top-level view of the process. At a block 210, a data flow analysis is performed on source code in a compiler. The data flow analysis may include construction of data flow graphs and control flow graphs. The data flow graphs and control flow graphs may be used to determine live ranges of variables in the source code. It must be noted that many different types of data flow analyses exist to determine live ranges of variables in source code. At a block 220, the live ranges of variables in the source code are determined. The process uses the live range analysis of the variable to perform further processing that enable the optimization of source code at a block 230.

Figure 3:
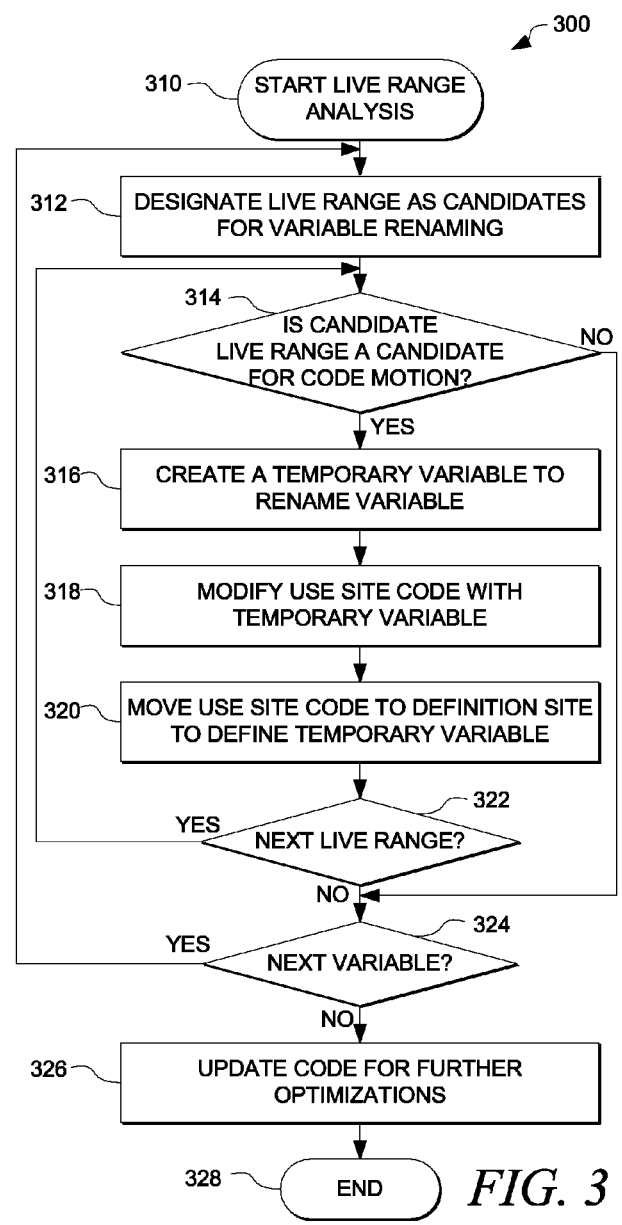
FIG. 3 illustrates a flowchart that provides details of the method according to one embodiment of the present disclosure.

FIG. 3 provides a detailed view of the novelty of the process. In FIG. 3, flowchart 300 illustrates a live range analysis that commences at block 310. At a block 312, it may be determined whether live ranges in the graph, previously identified, are candidates for variable renaming. The code pattern of all reached uses of the variable in the live range is checked to determine if the live range is a candidate for variable renaming based on its uses.

Table 1, illustrated below, provides an example of code with identified live range candidates for variable renaming.

TABLE 1

CODE WITH IDENTIFIED LIVE RANGE
CANDIDATES FOR VARIABLE RENAMING

```
 1 int a, b, c;
 2 char *p1, *p2, *p3;
 3 void foo( ) {
   .
   .
   .
10     if (b) {
11         a = strlen(p1);      // definition of a in the first
                                live range of a
12     } else {
13         a = abs(*p1) + 1;    // definition of a in the first
                                live range of a
14     }
15     b = ...;                 // definition of variable b
16     if (a > 0) {             // use of a in the first live range of a
17         b = b + 1;
18     }
19     a = strlen(p3); // definition of a in the second live
                       range of a
   .
   .
   .
23 }
```

In Table 1, the definition site of the code may be determined as extending for at least lines 10-14 and lines 19 et seq. The use site of the code may be determined as extending from at least lines 15-19. In the code, beginning at line 1, a, b, and c are declared as variables of type integer. At line 2, pointers *p1, *p2, and *p3 are declared as pointers of character or char variable type. There are two live ranges for integer value "a". A live range analysis identifies a first candidate live range for integer value "a" at line 11 and line 13, and a second candidate live range for integer value "a" at line 19. In the first live range of variable "a", the system checks all the reached uses of variable "a" and determines how to compare it to 0. In Table 1, at line 15, the definition of variable b between the definition sites of variable a, at lines 11 and 13, respectively, and the use site of variable a, at line 16 may result in decreased optimization because the use sites of variable a may not be moved or propagated to the definition sites of variable a. A Boolean variable may be created, as described later in this disclosure, to at least partially move the uses of the variables to its respective definition sites.

At a block 314, it is determined whether a candidate live range is a candidate for code motion. The criteria for this determination may be based on the prospect of future code optimization. For example, one criteria may be whether a folding opportunity exists after optimization. Another criteria may be based on whether the sized of a "use expression" will be optimized after code motion. If all the reached uses in the live range contain a common sub-expression which has a smaller size of data type than the variable in the live range, and may be move to a definition site, the live range may be considered a renaming candidate for code motion based on the uses.

It may be determined at block 314 that the live range candidate is a candidate for code motion and a new temporary variable may then be created at a block 316. The data type and data length of the variable that is created will be based on the data type and data length of the expressions of the reached uses. For each reached use of the live range, the system may then replace the expressions in the code for each reached use by renaming or loading the existing variable with the newly created temporary variable. For each definition of the live range, the system then modifies the defined expression to define a newly created variable based on the original expression and the reached uses.

For example, in Table 1, the reached uses of defined variable a in the first live range of a may be checked and the expression of comparison to zero, a>0, may be identified at line 16 in the use section of the code. The expression of comparison to zero is of Boolean type with the only possible value being TRUE or FALSE values. A new temporary variable of Boolean type, a1, may be created of length 1. The temporary variable may then replace the reached uses with the Boolean variable a1 in the first live range. At block 318, the code is modified at all the use sites with the temporary variable.

At a block 320, code may be moved from the use sites in the code to the definition sites to define a temporary variable. Table 2 illustrates the movement of the code from the use site to the definition site of the source code.

TABLE 2

CODE MODIFIED AT USE SITE TO DEFINITION SITE

```
1    int a, b, c;
2    char *p1, *p2, *p3;
3    void foo( ) {
4        boolean a1;        // a1 is a boolean variable
     .
     .
     .
8        if (b > 0) {
```

TABLE 2-continued

CODE MODIFIED AT USE SITE TO DEFINITION SITE

| | |
|---|---|
| 9 | a1 = (strlen(p1) > 0); // a is renamed and compare to 0 is added |
| 10 | } else { |
| 11 | a1 = ((abs(*p1) + 1) > 0); // a is renamed and compared to 0 |
| 12 | } |
| 13 | b = ...; |
| 14 | if (a1) {           // a1 is a boolean variable |
| 15 |     b = b + 1; |
| 16 | } |
| 17 | a = strlen(p2); |
| . | |
| . | |
| . | |
| 21 | } |

In Table 2, the definition of the Boolean value a1 replaces the definition of the variable "a" and the compares to zero are included in the expressions at the definition points of lines 9 and 11.

At a block 322, other live ranges may be processed. At a block 324, it is determined whether other variables need to be renamed within a live range. At a block 326, further optimization of the code may occur. For example, the code may be able to be folded at some definition points. Table 3 illustrates a further optimization that may occur.

In Table 3, line 9 illustrates the folding of the strlen call shown in line 9 of Table 2. Line 11 of Table 3 represents the folding of the absolute value function shown in line 11 of Table 2. Line 14 of Table 3 represents another folding optimization that will result in efficient code.

TABLE 3

OPTIMIZED CODE

| | |
|---|---|
| 1 | int a, b , c; |
| 2 | char *p1, *p2, *p3; |
| 3 | void foo( ) { |
| 4 |     boolean a1; |
| . | |
| . | |
| . | |
| 8 |     if (b > 0) { |
| 9 |         a1 = (p1 != NULL && p1[0] != '\0'); // strlen is folded |
| 10 |     } else { |
| 11 |         a1 = TRUE;                // abs is folded |
| 12 |     } |
| 13 |     b = ...; |
| 14 |     b = b + (int) a1;             // branch is folded |
| 15 |     a = strlen(p2); |
| . | |
| . | |
| . | |
| 19 | } |

The code may be updated with the optimized code replacing the original source code. The process may conclude at a block 328.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product comprising a computer-usable or computer-readable medium tangibly embodying program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic, magnetic, optical, semiconductor system, apparatus or device. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of compiler optimization, the method comprising:
    performing analysis of a source code to identify a use site and an associated definition site in a portion of the source code;
    building a control flow graph and a data flow graph wherein at least one live range is identified using the control flow graph and a data flow graph;
    determining whether the at least one identified live range is a candidate for code motion in the source code;
    designating, based on an analysis of the at least one live range, variables in the source code that are candidates for a renaming of the variables, wherein each live range of variables is computed recursively;
    determining, based on predetermined criteria, whether each live range of variables are candidates for code motion in the source code;
    responsive to a positive determination, modifying the code at the associated definition site and the use site; and
    optimizing the code in the compiler based on the modification by moving source code from the use site to the associated definition site, wherein a temporary variable is defined for each relocated variable.

2. The method of claim 1, wherein the analysis of live ranges comprises performing a data flow analysis that determines definition information and use information of a plurality of variables in source code.

3. The method of claim 2, wherein a data flow analysis comprises implementing a single static assignment analysis.

4. The method of claim 3, wherein the single static assignment analysis includes automatically generating the control flow graph and the data flow graph.

5. The method of claim 1, wherein the designating comprises checking variables in the expressions in the code and determining reached uses of the variables in the live range.

6. The method of claim 1, further comprising creating the temporary variable based on a data type and data length of an expression of reached uses in the live range.

7. The method of claim 6, wherein modifying the code comprises renaming the variables in the live range at all definition sites in the code and the use sites in the code.

8. The method of claim 1, wherein the predetermined criteria is based on determining whether a variable expression of the live range potentially exposes code folding opportunities in the code.

9. The method of claim 1, wherein the predetermined criteria is based on determining if a data type of a variable expression using the temporary variable is preferable to the original variable expression.

10. The method of claim 1, wherein optimizing the code comprises folding the code.

11. A computer program product comprising non-transitory computer recordable media including instructions stored thereon, which when executed by a processor, performs actions that optimizes source code in a compiler, the actions comprising:
    performing analysis of a source code to determine a use site and an associated definition site in a portion of the source code;
    building a control flow graph and a data flow graph wherein at least one live range is identified using the control flow graph and a data flow graph;
    determining whether the at least one identified live range is a candidate for code motion in the source code;
    designating, based on an analysis of the at least one live range, variables in the source code that are candidates for a renaming of the variables, wherein each live range of variables is computed recursively;
    determining, based on a predetermined criteria, whether each live range of variables is a candidate for code motion in the source code;
    responsive to a positive determination, modifying the code at the associated definition site and the use site; and
    optimizing the code in the compiler based on the modification by moving source code from the use site to the associated definition site to define a temporary variable for each relocated variable.

12. The computer program product of claim 11, wherein the analysis of the at least one live range comprises performing a data flow analysis that determines definition information and use information of a plurality of variables in source code.

13. The computer program product of claim 12, wherein the data flow analysis comprises implementing a single static assignment analysis.

14. The computer program product of claim 11, further comprising creating the temporary variable based on a data type and data length of an expression of reached uses in the live range.

15. The computer program product of claim 11, wherein modifying the code comprises renaming the variables in the at least one live range at all associated definition sites in the code and the use sites in the code.

16. The computer program product of claim 11, wherein the predetermined criteria is based on determining whether a variable expression of the at least one live range potentially exposes code folding opportunities in the code.

17. A system for code optimization in a compiler, the system comprising:
    a processor;
    a memory coupled to the processor, wherein the memory having stored computer usable code therein, the computer usable code comprising:
    computer usable code that performs analysis of a source code to determine a use site and an associated definition site of the source code;

computer usable code that builds a control flow graph and a data flow graph wherein at least one live range is identified using the control flow graph and a data flow graph;

computer usable code that determines whether the at least one live range identified is a candidate for code motion in the source code;

computer usable code that designates, based on an analysis of the at least one live range, variables in the source code that are candidates for a renaming of the variables, wherein each live range of variables is computed recursively;

computer usable code that determines, based on a predetermined criteria, whether the each live range of variables are candidates for code motion in the source code;

computer usable code that, responsive to a positive determination, modifies the code at the associated definition site and the use site; and computer usable code that optimizes the code in the compiler based on the modification by moving source code from the use site to the associated definition site to define a temporary variable for each relocated variable.

18. The system of claim 17, further comprising computer usable code that creates the temporary variable based on a data type and data length of an expression of reached uses in the live range.

19. The system of claim 18, further comprising computer usable code that modifies the code by renaming the variables in the at least one live range at all associated definition sites in the code and the use sites in the code.

20. The system of claim 18, further comprising computer usable code that optimizes the code by folding the code.

* * * * *